Sept. 15, 1959 R. BIRD 2,904,252

ELECTRONIC CALCULATING APPARATUS FOR ADDITION AND SUBTRACTION

Filed March 26, 1953 3 Sheets-Sheet 1

INVENTOR
RAYMOND BIRD
BY [signature]
ATTORNEY

INVENTOR
RAYMOND BIRD
BY [signature]
ATTORNEY

ELECTRONIC CALCULATING APPARATUS FOR ADDITION AND SUBTRACTION

Filed March 26, 1953 3 Sheets-Sheet 3

INVENTOR
RAYMOND BIRD
BY [signature]
ATTORNEY 2,904,252
Patented Sept. 15, 1959

2,904,252

ELECTRONIC CALCULATING APPARATUS FOR ADDITION AND SUBTRACTION

Raymond Bird, Letchworth, England, assignor to International Computers and Tabulators Limited, a British company Application March 26, 1953, Serial No. 344,713

Claims priority, application Great Britain April 16, 1952

12 Claims. (Cl. 235—176)

This invention relates to electronic apparatus for performing addition and subtraction in binary.

Binary serial adders have been proposed in which coincidence circuits are used to determine the sum of two binary numbers. The coincidence circuits detect the various combinations of voltages representing one digit of each of the numbers to be added and a carry from the addition of the next lower denomination. The output of the coincidence circuits consists of a sum digit and a new carry digit. In comparing three sources, the circuits have to be responsive to eight possible combinations and accordingly require a considerable number of components.

The effect subtraction it is usual to employ a coincidence type adder and to convert one of the numbers to a complementary form before applying it to the adder.

It is the object of the present invention to provide simplified electronic apparatus for effecting addition or subtraction of two binary numbers in which the sum or difference digit is determined by a comparison between two digits.

According to the invention electronic apparatus for forming the sum digit of three binary digits, a binary one being represented by one pre-determined voltage and a binary zero by a second pre-determined voltage, has means for comparing two of the digits for equality or inequality and means, controlled by the comparing means, for reading out the third digit as the sum digit on equality and for reading out the inverse of the third digit as the sum digit on inequality. In the case of subtracting a first and second binary digit from a third binary digit, the inverse of the third digit is read out as the difference digit on equality and the third digit is read out as the diffence digit on inequality.

The invention will now be described, by way of example, with reference to the accompanying drawings, in which.

Figure 1:
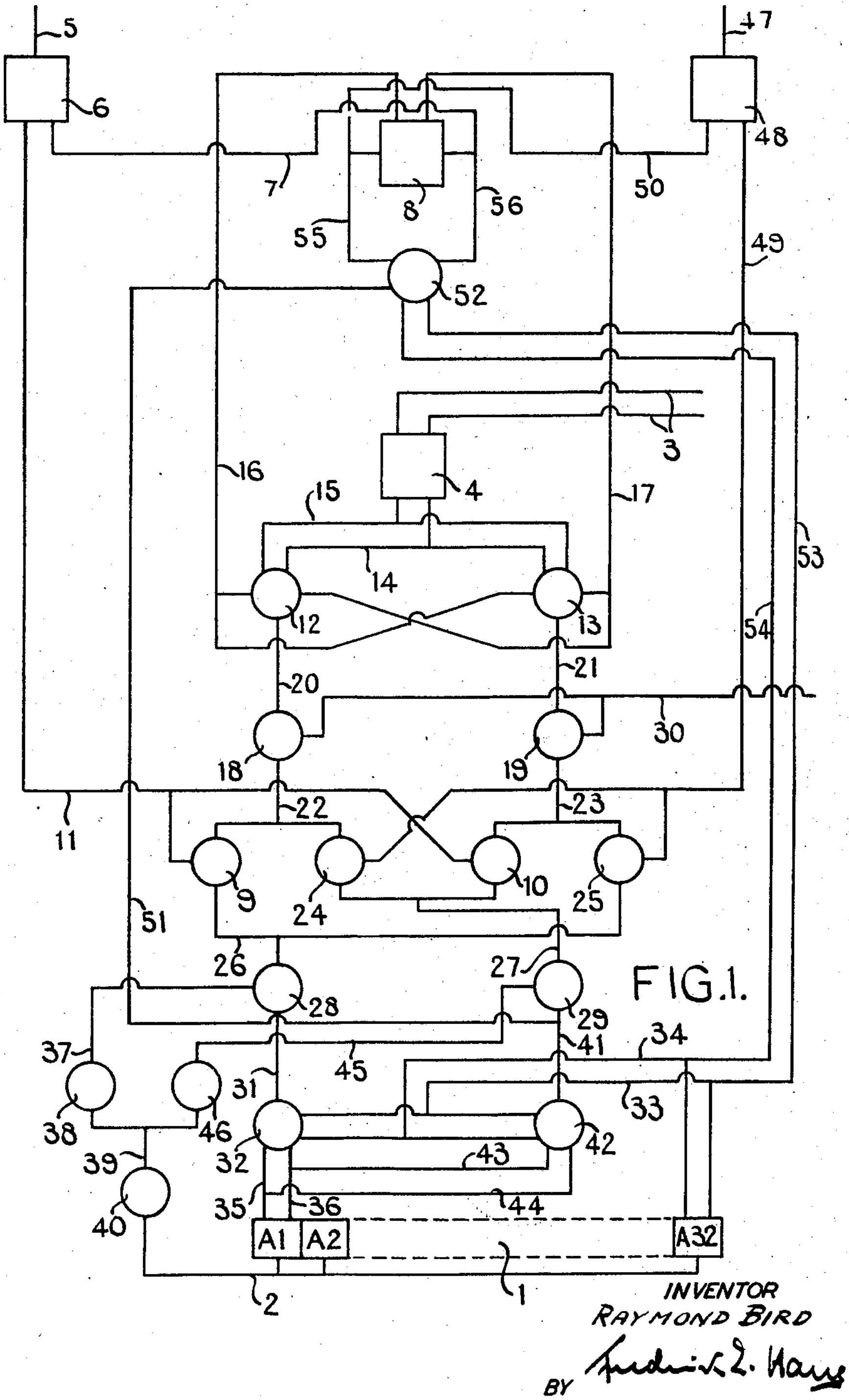
Figure 1 is a block diagram of a combined adding and subtracting device.

The two numbers to be added may be represented by pulse trains in which a binary one in a particular denomination is indicated by a pulse occurring at a corresponding time and a binary zero is indicated by the absence of a pulse at the time or by the presence of one of two discrete voltage levels on a line or lines.

The various combinations of conditions which may occur when adding a single denomination of two numbers A and B and a possible carry from the addition in the next lower denomination are set out below.

| A digit | B digit | Carry | Sum digit | New carry |
|---|---|---|---|---|
| 0 | 0 | 0 | 0 | 0 |
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 0 | 1 | 1 | 0 | 1 |
| 1 | 0 | 1 | 0 | 1 |
| 1 | 1 | 1 | 1 | 1 |

The two following rules give the correct sum digit and new carry:

(1) If the A digit and the carry are the same then the sum digit is the same as the B digit and the carry is unchanged.

(2) If the A digit and the carry are different then the sum digit is the inverse of the B digit and the new carry is the same as the B digit.

These two rules remain correct if A and B are interchanged. Hence, a single comparison to determine whether one of the digits to be added and the previous carry are like or unlike is sufficient to indicate the correct sum digit and the new carry.

A similar table may be used to show the combinations occurring when the number A is subtracted from the number B. In this case, the new carry digit has to be subtracted from the next higher denomination.

| A digit | B digit | Carry | Difference digit | New carry |
|---|---|---|---|---|
| 0 | 0 | 0 | 0 | 0 |
| 1 | 0 | 0 | 1 | 1 |
| 0 | 1 | 0 | 1 | 0 |
| 0 | 0 | 1 | 1 | 1 |
| 1 | 1 | 0 | 0 | 0 |
| 0 | 1 | 1 | 0 | 0 |
| 1 | 0 | 1 | 0 | 1 |
| 1 | 1 | 1 | 1 | 1 |

The difference digit is given by the three following rules:

(1) If the A digit and the carry are the same, then the difference digit is the inverse of the B digit and the new carry is the same as the B digit.

(2) If the A digit and the carry are different, then the difference digit is the same as the B digit and the new carry is the same as the previous carry.

(3) A carry of one is introduced at the beginning of the subtraction and any carry occurring at the end of the subtraction is discarded.

The introduction of the initial carry means that the new carry obtained does not agree with that shown in the table, although the correct difference digit is obtained.

It may also be noted that the application of rules (1) and (2) to the table leads to apparent contradictions, such as that the difference digit is one when the A, B and carry digits are zero. However, since the carry is initially one and is only changed to zero if the A digit and the carry are the same and the B digit is zero, the step previous to all three digits being zero must have produced a carry to be subtracted from the B digit of zero and the difference digit is, therefore, one.

As an example, consider the subtraction of the binary number 0101 from 1000 according to the rules set out above:

| A digit | B digit | Carry | Difference digit | New carry |
|---|---|---|---|---|
| 1 | 0 | [1] 1 | 1 | 0 |
| 0 | 0 | 0 | 1 | 0 |
| 1 | 0 | 0 | 0 | 0 |
| 0 | 1 | 0 | 0 | 1 |

[1] Initial.

Thus the correct difference of 0011 is obtained, together with a final carry of one, which is discarded.

One circuit for carrying out addition and subtraction using the system described is shown in block diagram form in Figure 1. It is assumed that the circuit forms part of a computer which stores the numbers and instructions relating to a problem and also supplies control pulses to the circuit.

The general operation of the circuit during adding will be considered first. One of the numbers to be added is stored on a shifting register 1 (Figure 1) comprising thirty two trigger stages A1, A2–A32. Each of the stages has two stable states and is set in one or other state to represent a binary one or zero. The register, therefore, stores a binary number of thirty two digits, the least significant digit being stored by A32. By suitably pulsing a line 2 connected to all the stages of the register, the setting of A1 is transferred to A2, the setting of A2 is transferred to A3 and so on.

The digits of the second number to be added are fed serially to the circuit, for example, from a magnetic drum storage or an acoustic delay line, on two lines 3. These two lines are connected respectively to the two grids of a trigger stage 4, so that the trigger circuit is set to one or other state depending upon whether the incoming or "incident" digit is one or zero.

When the computer receives an "Add" instruction a control voltage is applied to a line 5 which is connected to a Schmidt trigger stage 6. The control voltage is maintained for the duration of adding, to switch the trigger 6 to "on" and keep it in this condition.

The trigger 6 is connected to a carry storage trigger 8 by a line 7, so that when the trigger 6 is switched "on," a pulse is transmitted to the trigger 8 to switch it "off," in which state it represents zero.

The trigger 6 also applies a control voltage to two gate valves 9 and 10 via a line 11.

The settings of the triggers 4 and 8 which represent the incident digit and the carry, respectively, are compared by a coincidence circuit 12 and an anti-coincidence circuit 13. These two circuits are connected to the two anodes of the trigger 4 by lines 14 and 15 and are connected to the two anodes of the trigger 8 by lines 16 and 17.

When the two triggers 4 and 8 are in the same state, the combination of anode voltages is such that the coincidence circuit 12 applies a priming control voltage to a gate circuit 18 via a line 20. A train of timing or clock pulses is also applied to the gate circuit 18 by a line 30. These clock pulses are derived from a suitable source in the computer and their frequency is the same as that of the pulses used to control the reading out of the number from the magnetic drum storage. The clock pulses are slightly delayed with respect to the incident digit pulses to allow the coincidence and anti-coincidence circuits to obtain equilibrium before the gate circuit 18 is impulsed.

When the gate valve 18 is primed by a voltage from the coincidence circuit 12 and receives a pulse via the line 30, an output pulse is produced which is fed to the gate circuit 9 and a gate circuit 24, in common, via a line 22. The gate circuit 9 already has a control voltage applied to it from the trigger 6, so that it produces an output pulse on line 26. This output pulse is fed in common to the two grids of a twin triode amplifier 28. The output pulse from the anode of one of the amplifiers is fed via a line 31 to a double diode gate 32. The input side of the gate is connected by lines 33 and 34 to the two anodes of the last stage A32 of the shifting register 1. The output of the diode gate 32 is connected by lines 35 and 36 to the grids of the first stage A1 of the shifting register. When the pulse on line 31 is applied to the gate 32 it allows the setting of stage A32 to be transferred to stage A1 of the shifting register.

The output pulse from the anode of the second amplifier 28 is fed to a buffer diode 38 via a line 37 and thence via a line 39 to a pulse generator 40. The pulse generator is thereby triggered to produce a single output pulse on the line 2 which applies it to all the stages of the shifting register 1 in common. The pulse on the line 2 transfers the setting of stage A1 to stage A2, and so on, simultaneously with the setting of A1 to correspond with A32 by the action of the diode gate 32.

If the incident digit and the carry are not the same, then the anti-coincidence circuit 13 will be operative to prime a gate valve 19 via a line 21. The gate valve 19 also receives clock pulses from the line 30 and will therefore produce an output on a line 23 which is applied in common to two gate circuits 10 and 25. Gate circuit 10 is already primed by a voltage from the trigger 6 and will therefore produce an output on a line 27 which is applied in common to the two grids of a double triode amplifier 29.

The output pulse from one anode of the amplifier 29 is applied via a line 41 to a double diode gate 42. The input of the gate 42 is connected to stage A32 of the shifting register, and the output is connected to stage A1 by lines 43 and 44. The lines 43 and 44 are oppositely connected to the lines 35 and 36 from the diode gate 32 so that when the gate 42 is made operative by a pulse on line 41 the setting of A32 is transferred in inverse form to A1, i.e. if A32 is "off" A1 is set "on" and if A32 is "on" A1 is set "off."

The output pulse from the second anode of the amplifier 29 is fed via line 45 to a buffer diode 46, the output from which operates the pulse generator 40 to cause the contents of the register 1 to be shifted along one stage, as already described.

The output pulse from the first anode of the amplifier 29 is also fed via a line 51 to a double diode gate 52, the input of which is connected to the anodes of stage A32 of shifting register by lines 53 and 54. The output of the diode gate is connected by lines 55 and 56 to the grids of the carry trigger stage 8. When the pulse on line 51 makes the diode gate 52 operative, the setting of stage A32 is transferred to the carry trigger stage 8 directly.

Thus when the coincidence circuit 12 is operative the setting of stage A32 is transferred to the stage A1 direct, and the pulse generator 40 is triggered to shift the contents of the register 1. When the anti-coincidence circuit 13 is operative the setting of stage A32 is transferred to stage A1 inverted, the pulse generator 40 is triggered to step the shifting register and the diode gate 52 is made operative to transfer the setting of A32 to the carry trigger stage 8.

After the first incident digit has been compared with the stored carry of zero and the appropriate transfer effected the second digit will be set up on the trigger stage 4, and the next addition will be performed under control of the next clock pulse on the line 30. The two least significant digits of the sum will then be stored on stages A2 and A1 respectively of the shifting register. The addition for the remaining thirty denominations will proceed in the same way so that finally the sum will be stored on the shifting register 1. The adding operation now being complete, the control voltage on line 5 will be removed so that the trigger stage 6 reverts to the "off" condition and the gate circuits 9 and 10 are no longer primed, thus rendering the adder inoperative.

When subtraction is to be effected the computer puts a control voltage on a line 47 which switches a Schmidt trigger stage 48 "on." This stage applies a control voltage via a line 49 to the two gate circuits 24 and 25 and also via a line 50 feeds a pulse to the carry trigger stage 8 to set it "on" to represent "1."

If the coincidence circuit 12 is operative, the resulting pulse from the gate circuit 18 now produces an output from the gate circuit 24 which is applied via line 27 to the amplifier 29.

When adding, the amplifier 29 was operated by the anti-coincidence circuit 13. Thus the coincidence circuit 12, during subtraction, produces the same result as operation of the anti-coincidence circuit 13 during adding. Similarly, the anti-coincidence circuit 13, via the gate circuit 25 produces the same result during subtraction as operation of the coincidence circuit 12 does during adding.

Various circuits used to build up the complete adder and subtractor will now be described in detail.

*Schmidt trigger stages 6 and 48*

The purpose of these circuits is primarily to provide a fixed value of control voltage during adding and subtracting respectively to prime the gating circuits 9, 10, 24 and 25. The two triggers are identical except for their input and output connections and the add trigger 6 only will be described in detail.

Figure 6:
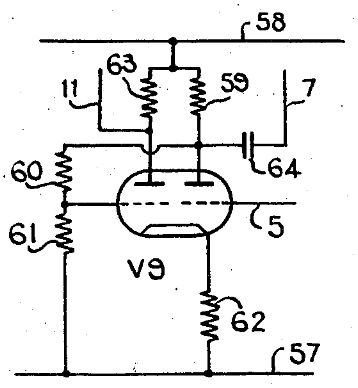
Figure 6 is a circuit diagram of a Schmidt trigger stage.

The trigger comprises a double triode V9 (Figure 6), of which the right hand grid is connected directly by line 5 to the computer control circuits. The left hand grid is connected to the junction of two resistors 60 and 61 which, together with the resistor 59, form a potentiometer between a HT positive supply line 58 at approximately 150 volts and an HT negative line 57. This grid is therefore held positive and in the "off" condition of the trigger the left hand half of the valve is conducting. Current flows through a cathode resistor 62 so that the cathode of the valve is held just above the potential of the left hand grid. The normal potential of line 5 is less than this cathode potential, so that the right hand half of the valve is non-conducting. Due to an anode resistor 63 the line 11, which is connected to the left hand anode, is maintained at approximately 50 volts less than the HT supply voltage.

When the computer receives an "Add" instruction the potential of line 5 (and consequently the right hand grid) is raised above that of the left hand grid. As a result, the right hand half of the valve now conducts and raises the potential of the cathode sufficiently to cut off current in the left hand half of the valve and line 11 rises to HT potential. The right hand anode of the valve is connected to the HT line 58 through a resistor 59, so that the anode potential drops when the valve conducts and a negative pulse is fed to the carry storage trigger 8 via a condenser 64 and the line 7.

Thus, provided that the change of potential of line 5 is above a certain minimum value sufficient to switch the trigger from the "off" to the "on" condition, the change of potential of the line 11 will be a fixed value independent of variations in the potential of the line 5.

*Carry storage trigger stage 8*

This trigger is generally similar to those used in the shifting register and for storing the incident digit. It is of known form, employing a double triode V6 (Figure 2) with the grids and anodes D.C. cross-coupled to obtain two stable conductive states. The left hand anode of the valve is connected to the HT line 58 through a resistor 66 and to the right hand grid through a resistor 69. The right hand anode is connected to the HT line 58 through a resistor 65 and to the left hand grid through a resistor 67. The two grids are connected to the line 57 through resistors 70 and 68 respectively and the cathode is connected to line 57 through a resistor 71.

The convention will be adapted that a trigger is in the "off" state when the left hand half of the valve is conducting and the right hand half is cut off. Accordingly, when the trigger 8 is "off" the left hand grid will be at a potential determined by the potentiometer formed by the resistors 65, 67 and 68 and the cathode will be a little above this potential. The potential of the left hand anode is approximately 50 volts and of the right hand anode 100 volts. Consequently, the right hand grid, which is connected to the left hand anode, will be below the cathode potential, maintaining the right hand half of the valve non-conducting.

The trigger is switched from one state to the other by applying a negative pulse of sufficient amplitude to the grid of the conducting half of the valve to cut it off and thus allow the other half of the valve to conduct.

The state of the carry trigger 8 may be changed at the beginning of an adding or subtracting operation by a pulse on line 7 or line 50 from one of the Schmidt triggers or during the operation by a pulse on lines 55 or 56 from the diode gating circuit 52.

*Incident digit trigger 4*

This consists of the double triode V8 (Figure 2) which is similarly connected to the valve V6, except that only two lines, the lines 3, are provided to alter the state of the trigger. As each digit is read out from the computer storage it controls the impulsing of one of the lines 3. If the digit is zero, a negative pulse is fed to the right hand grid which will switch the trigger "off" if it is already "on" or will leave it "off." If the digit is a "1," the left hand grid receives a pulse which will switch the trigger from "off" to "on."

*Coincidence circuit 12 and anti-coincidence circuit 13*

Figure 2:
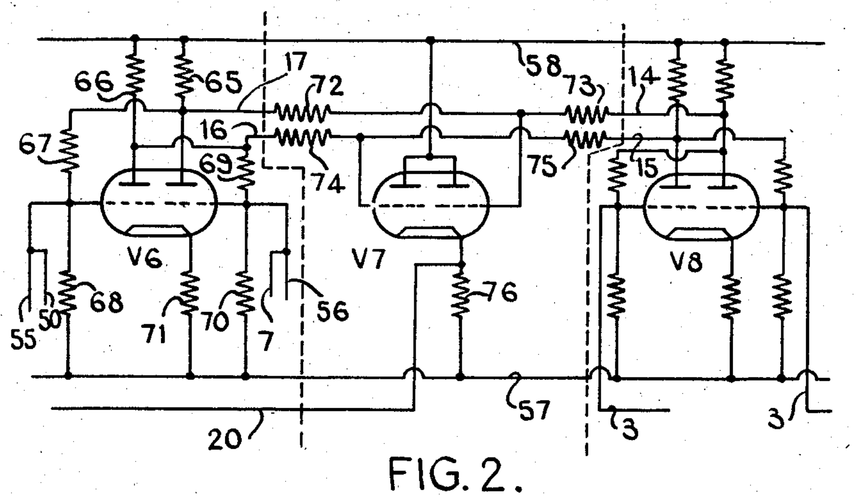
Figure 2 is a circuit diagram of a coincidence circuit and the associated trigger stages.

These circuits which compare the states of the two triggers 4 and 8 to determine whether they are the same or different consists of a double triode V7 and the parts shown between the dotted lines (Figure 2). The left hand grid of V7 is connected through a resistor 74 to the left hand anode of V6 and through a resistor 75 to the left hand anode of V8. The right hand grid of V7 is connected through a resistor 72 to the right hand anode of V6 and through a resistor 73 to the right hand anode of V8. The two anodes of V7 are commoned and connected to the HT line 58 and the cathode is connected through a resistor 76 to the line 57. With these connections the cathode of V7 will be at a higher potential when the triggers 4 and 8 are in the same state than when they are in dissimilar states. This is shown by the table below.

| | L.H. anode V6 | R.H. anode V6 | L.H. anode V8 | R.H. anode V8 | L.H. grid V7 | R.H. grid V7 |
|---|---|---|---|---|---|---|
| 4 off 8 off | 50 | 100 | 50 | 100 | 50 | 100 |
| 4 on 8 off | 100 | 50 | 50 | 100 | 75 | 75 |
| 4 on 8 on | 100 | 50 | 100 | 50 | 100 | 50 |
| 4 off 8 on | 50 | 100 | 100 | 50 | 75 | 75 |

The common cathode will assume a potential slightly above that of the highest grid so that when both triggers 4 and 8 are in the same state the cathode of V7 will be approximately 100 volts whereas it will be 75 volts when the trigger states are dissimilar. Hence the line 20 connected to the cathode of V7 rises in potential when the two triggers are in the same state.

The anti-coincidence circuit 13 comprises a similar arrangement to that of the coincidence circuit 12, except that the resistors corresponding to resistors 73 and 75 are connected to the left hand and right hand anodes of V8 respectively. With these connections the cathode of V7 rises to approximately 100 volts whenever the triggers 4 and 8 are in opposite states.

*Gating circuits 18, 19, 9, 10, 24 and 25*

Figure 7:
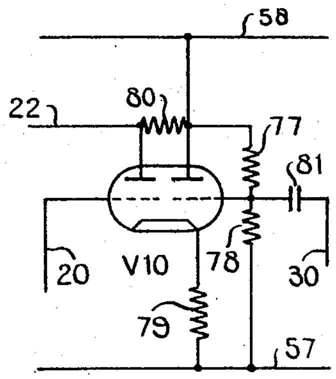
Figure 7 is a circuit diagram of a gate circuit.

All these circuits are similar so that the gating circuit 18 only will be considered in detail. This consists of a double triode V10 (Figure 7). The right hand grid of the triode is connected to the junction of two resistors 77 and 78 which form a potentiometer between the HT lines 58 and 57. This normally maintains the grid at approximately 110 volts. The right hand anode is connected to the line 58 and the common cathode to the line 57 through a resistor 79. Consequently, the cathode is held at a little more than 110 volts positive. The left hand grid is connected to the line 20 from the coincidence circuit 12 and the anode is connected through a resistor 80 to the line 58. The line 20 never rises above 100 volts so that normally the left hand half of the valve is non-conducting.

The line 30 carrying the clock pulse is connected to the right hand grid through a condenser 81. When a negative going clock pulse of approximately 30 volts amplitude is applied to the right hand grid, the grid and the cathode will tend to drop to 80 volts positive. If the line 20 is at +75 volts, the left hand half of the valve will still not conduct. If, however, the line 20 is at +100 volts the cathode will fall to approximately this value and be maintained there by conduction occurring in the left hand half of the valve. When this happens the voltage of the left hand anode will drop, producing a negative output pulse.

This negative output pulse acts as the input pulse for the right hand grid of the gating circuits 9 and 24 whilst the positive priming voltage on the left hand grid is provided by the triggers 6 and 48 respectively.

*Amplifiers 28 and 29 buffer diodes 38 and 46*

The amplifiers 28 and 29 each consists of a double triode. The grids of each triode pair are commoned and receive the negative output pulses from the gating circuits 9, 10, 24 and 25. The valves have only a small standing bias and the anodes are not commoned so that separate positive going output pulses are produced at each anode.

The buffer diodes 38 and 46 are each a single diode with the anode connected to the output of the corresponing amplifier and the cathodes commoned and connected to the input of the pulse generator 40. Their purpose is a provide isolation between the circuits.

*Shifting register*

Each stage of the shifting register comprises a trigger similar to the carry storage trigger 8. The first two stages A1 and A2 (Figure 1) are shown in detail in Figure 3. The left and right hand anodes of the first stage V1 are connected through resistors 87 and 86 to the cathodes of a pair of diodes V2, the anodes of which are connected to the right and left hand grids respectively of the second stage V3. The cathodes of the diodes are each connected to the line 2 through condensers 88 and 89 respectively.

The anode potential of one half of the trigger may be either 50 or 100 volts and the corresponding grid potentials are approximately 33 or 22 volts. Hence, for the various combinations of states of the stages A1 and A2, the cathode to anode potential differences of the left and right hand sides of V2 will be as set out below:

| A1 | A2 | L.H.S. of V2 | R.H.S. of V2 |
|---|---|---|---|
| On | On | 100−33=67 | 50−22=28 |
| Off | On | 50−33=17 | 100−22=78 |
| On | Off | 100−22=78 | 50−33=17 |
| Off | Off | 50−22=28 | 100−33=67 |

If, now, a negative going pulse of approximately 60 volts amplitude is applied on the line 2, only one side of V2 will conduct for any particular combination of states, that side having the smaller cathode to anode potential. When the triggers are in different states, the negative pulse is fed, through V2, to the grid of A2 which is at 33 volts, so switching A2 over to the same state as A1. When the triggers are in the same state, the negative pulse is fed to the grid of A2 which is at 22 volts, so that it is merely driven even further below the other grid and the trigger remains in the same state.

A similar diode circuit is connected between A2 and the next stage, and so on, up to A32, the lines 2 being connected in common to all the diodes circuits so that a single pulse on line 2 causes the setting of the registers to be shifted up one stage, the previous setting of A32 being lost.

*Pulse generator 40*

Figure 4:
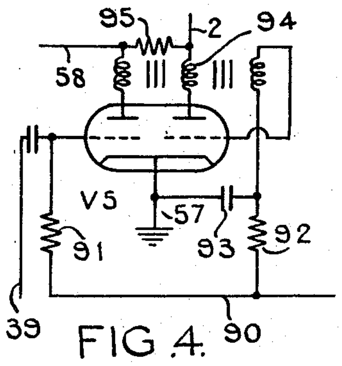
Figure 4 is a circuit diagram of a pulse generator.

The pulse generator comprises a blocking oscillator of known form. The positive triggering pulse from the buffer diodes 38 or 46 is applied through a condenser to one grid of a double triode V5 (Figure 4). The grid is normally held below cut-off by a connection through a resistor 91 to a negative bias line 90. The pulse of the anode current produced by the input pulse passes through one winding of a transformer 94. The second grid of V5 is connected through the second winding of the transformer 94 and a resistor 92 to the bias line 90 and the junction of the winding and the resistor is by-passed to line 57 by a condenser 93. The corresponding anode is connected through a third winding of the transformer 94 and a resistor 95 to the HT line 58.

The pulse of the anode current in the first winding induces a voltage in the second winding so that the grid connected to it is brought about cut-off. The second valve of the triode then acts as a blocking oscillator by regeneration between the second and third windings to produce a large output pulse. The time constants of the circuit are so chosen that the output on the line 2 connected to the junction of the resistor 95 and to a third winding of the transformer is a single negative going pulse.

*Diode gate circuits 32, 42 and 52*

These gating circuits are similar and the gating circuit 42 only will be described in detail.

Figure 3:
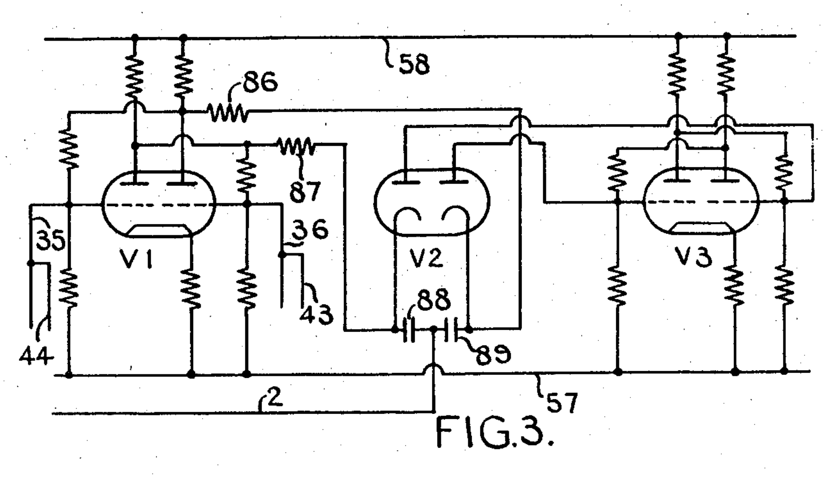
Figure 3 is a circuit diagram of two adjacent stages of a shifting register.
Figure 5:
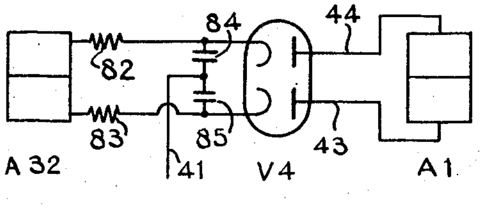
Figure 5 is a circuit diagram of a double diode gate.

The left and right hand anodes of the triggers comprising the stage A32 of the shifting register are connected through resistors 82 and 83 (Figure 5) to the cathodes of two diodes V4. The anodes of the diodes are connected to the left and right hand grids respectively of the valve V1 forming the stage A1 (Figures 3 and 5). The cathodes of the diode V4 are connected through condensers 84 and 85 to the line 41.

By comparison with the table given in the description of the shifting register it will be apparent that a 60 volt negative pulse on line 41 will be effective to change the state of A1 only when A1 and A32 are in the same state. Hence the diode gate 42, when it is operative ensures that the setting of A1 is the inverse of the setting of A32.

The diode gating circuits 32 and 52 are similar to the circuit 42, except that the connections from the diode anodes to the trigger grids are the opposite of those described for the circuit 42, so that the operation of these circuits is similar to that of the double diodes in the shifting register.

*Modified adder*

In the form of adder described so far, the incident digit, the carry, the second number to be added, and the sum, are all stored statically for at least the duration of one digit time. It will be appreciated, however, that the inputs and outputs may be applied to the adder in dynamic form, that is to say, as serial pulse trains without altering the mode of operation. The static comparison circuits are replaced by pulse comparing circuits which might, for example, be similar to the gating circuits 18. The carry storage is replaced by a delay device having a delay equal to that between succeeding clock pulses and a gate controlled by the digit comparison which enters a one or zero into the delay device as required so that a carry indication is always available for comparing with the incident digit at the appropriate time. The output sum, instead of being entered in the shifting register, is fed to some other form of storage device, such as a magnetic drum or acoustic delay line.

What I claim is:

1. In electronic adding apparatus for summing a first and a second multi-denominational serial binary numbers, the digits of successive denominations of each said number being successively represented by one of two predetermined voltages representing a binary one and a binary zero respectively and the voltages representing the digits in the same denominations of the two numbers appearing simultaneously, the combination of storage means for storing between successive denominations inter-denominational carry digit representing voltages, electronic comparing means, means for applying successively to said comparing means the voltage representations of the successive digits of said first number and the carry digit representing voltages from said storage means, said comparing means selectively for each denomination producing one of two distinctive signals, the first and the second of said distinctive signals representing equality and inequality respectively of said voltages applied to said comparing means, means responsive to the production of said first distinctive signal for producing a sum digit representing voltage corresponding to the voltage representation of the digit of the same denomination of said second number, and means responsive to the production of said second distinctive signal for producing a sum digit representing voltage corresponding to said predetermined voltage other than that representing the digit of said same denomination of said second number and for causing said carry digit representing voltage of said storage means to be changed to agree with the voltage representation of said digit of said second number.

2. In electronic adding apparatus for summing a first and a second multi-denominational serial binary numbers, the digits of successive denominations of each said number being successively represented by one of two predetermined voltages representing a binary one and a binary zero respectively and the voltages representing the same denominations of the two numbers appearing simultaneously, the combination of storage means for storing between successive denominations inter-denominational carry digit representing voltages, means for storing a zero representing voltage in said storage means prior to the addition of the lowest denomination of said two number, electronic comparing means, means for applying said comparing means the successive voltage representations of the digits of the denominations of said first number and the successive carry digit representing voltages from said storage means, said comparing means for each denomination selectively producing one of two distinctive signals, the first and the second of said distinctive signals representing equality and inequality respectively of said voltages applied to said comparing means, means responsive to the production of said first distinctive signal for producing a sum digit representing voltage corresponding to the voltage representation of the digit of the same denomination of said second number, and means responsive to the production of said second distinctive signal for producing a sum digit representing voltage corresponding to said predetermined voltage other than that representing the digit of said same denomination of said second number and for causing said carry digit representing voltage of said storage means to be changed to agree with the voltage representation of said digit of said second number.

3. In electronic subtracting apparatus for subtracting a first multi-denominational serial binary number from a second similar number, the digits of successive denominations of each said number being successively represented by one of two predetermined voltages representing a binary zero respectively and the voltages representing the same denominations of the two numbers appearing simultaneously, the combination of storage means for storing between successive denominations inter-denominational carry digit representing voltages, electronic comparing means, means for applying successively to said comparing means the voltage representations of the successive digits of said first number and the carry digit representing voltages from said storage means, said comparing means for each denomination selectively producing one of two distinctive signals, the first and second of said distinctive signals representing equality and inequality respectively of said applied voltages, means responsive to the production of said first distinctive signal for producing a difference digit representing voltage corresponding to said predetermined voltage other than that presenting the digit of the same denomination of said second number and for causing said carry digit representing voltage of said storage means to agree with the voltage representation of said digit of said second number, and means responsive to the production of said second distinctive signal for producing a difference digit representing voltage corresponding to said voltage representation of said digit of said second number.

4. In electronic subtracting apparatus for subtracting a first multi-denominational serial binary number from a second similar number, the digits of successive denominations of each said number being successively represented by one of two predetermined voltages representing a binary one and a binary zero respectively and the voltages representing the same denominations of the two numbers appearing simultaneously, the combination of storage means for storing between successive denominations inter-denominational carry digit representing voltages, means for storing a binary one representing voltage in said storage means prior to the subtraction of the lowest denomination of said two numbers, electronic comparing means, means for applying to said comparing means the successive voltage representations of a digit of a denomination of said first number and the successive carry digit representing voltages from said storage means, said comparing means selectively for each denomination producing one of two distinctive signals, the first and the second of said distinctive signals representing equality and inequality respectively of said applied voltages, means responsive to the production of said first distinctive signal for producing a difference digit representing voltage corresponding to said predetermined voltage other than that representing the digit of the same denomination of said second number, and for causing said carry digit representing voltage of said storage means to agree with the voltage representation of said digit of said second number, and means responsive to the production of said second distinctive signal for producing a difference digit representing voltage corresponding to said voltage representation of said digit of said second number.

5. Electronic apparatus for adding and subtracting two serial binary numbers comprising a first control means effective during addition, a second control means effective during subtraction, a first trigger stage having two stable states, means for setting said first trigger stage successively in accordance with the successive digits of one said number, a second trigger stage, means for setting said second trigger stage in accordance with successive inter-denominational carries, a shifting register having a plurality of stages, for storing voltage representations of the digits of said second number, means for comparing the states of said first trigger stage and said second trigger stage, gating means controlled jointly by said comparing means and said first and second control means, means controlled by said gating means for setting the first stage of said shifting register to the same setting as the last stage, and for both setting said second trigger stage to the same setting as said last stage and setting said first stage of said shifting register to the state opposite to the state of the last stage, in accordance with the effectiveness of said first and second control means and the relative states of said first and second trigger stages, and means for stepping said shifting register each time said first stage is set.

6. Electronic apparatus for adding and subtracting two serial binary numbers comprising a first control means effective during addition, a second control means effective during subtraction, a first trigger stage having two stable states, means for setting said first trigger stage successively in accordance with the successive digits of one said number, a second trigger stage, means for setting said second trigger stage in accordance with successive inter-denominational carries, a shifting register having a plurality of stages, for storing voltage representations of the digits of said second number, means for comparing the states of said first trigger stage and said second trigger stage, gating means controlled jointly by said comparing means and said first and second control means, first setting means for setting the first stage of said shifting register to the same setting as the last stage, second setting means for both setting said second trigger stage to the same setting as said last stage of said shifting register and setting said first stage of said shifting register to the state opposite to the state of the last stage, means controlled by said gating means for rendering operative said first setting means when said first control means are effective and the states of said first and second trigger stages are the same and when said second control means are effective and the states of said first and second trigger stages are different, means controlled by said gating means for rendering operative said second setting means when said first control means are effective and the states of said first and second trigger stages are different and when said second control means are effective and the states of said first and second trigger stages are the same, and means for stepping said shifting register each time said first stage is set by said first and second setting means.

7. Electronic apparatus for adding and subtracting two serial binary numbers comprising a first control means effective during addition, a second control means effective during subtraction, a first trigger stage having two stable states, means for setting said first trigger stage successively in accordance with the successive digits of one said number, a second trigger stage, means for setting said second trigger stage in accordance with successive inter-denominational carries, a shifting register having a plurality of stages for storing voltage representations of digits of said second number, a coincidence circuit and an anticoincidence circuit, rendered effective when said first and second trigger stages are in the same states and in opposite states respectively, first and second gating means controlled jointly by said coincidence circuit and said first and second control means respectively, third and fourth gating means controlled jointly by said anti-coincidence circuit and said first and second control means respectively, first setting means rendered operative by said first gating means and by said fourth gating means for setting the first stage of said shifting register to the same setting as the last stage, second setting means rendered operative by said second gating means and by said third gating means for both setting said second trigger stage to the same setting as said last stage of said shifting register and setting said first stage of said shifting register to the state opposite to the state of said last stage, and means for stepping said shifting register each time said first stage of said shifting register is set by said first and second setting means.

8. Electronic apparatus for adding and subtracting as claimed in claim 7 in which said coincidence circuit and said anticoincidence circuit each comprises a pair of valves, resistances connecting each control grid to one anode of said second trigger stage and one anode of said first trigger stage and a common load resistance for the two cathodes of said valves, whereby the voltage developed across said load resistance is a maximum when the trigger stages are in the same state and dissimilar states respectively.

9. Electronic apparatus for adding and subtracting as claimed in claim 7 comprising also a gating circuit for said coincidence circuit and for said anti-coincidence circuit and means for applying a train of clock pulses to each said gating circuit, whereby output pulses are produced from the gating circuit on receipt of a clock pulse.

10. In electronic adding apparatus for summing a first and a second multi-denominational serial binary numbers, the digits of successive denominations of each said number being successively represented by one of two predetermined voltages representing a binary one and a binary zero respectively and the voltages representing the digits in the same denominations of the two numbers appearing simultaneously, the combination of storage means for storing between successive denominations inter-denominational carry digit representing voltages, electronic comparing means, means for applying successively to said comparing means the voltage representations of the successive digits of said first number and the carry digit representing voltages from said storage means, said comparing means selectively producing for each denomination a first and a second distinctive signal, said distinctive signals representing equality and inequality respectively of said voltages applied to said comparing means, means responsive to the production of said first distinctive signal for reading out as a sum digit representing voltage, the voltage representing the digit of the same denomination of said second number, and means responsive to the production of said second distinctive signal for reading out as a sum digit representing voltage, said predetermined voltage other than that representing the digit of said same denomination of said second number and for applying to said storage means the voltage representing said digit of said second number to cause said carry digit representing voltage of said storage means to be changed to agree with the voltage representation of said digit of said second number.

11. In electronic subtracting apparatus for subtracting a first multi-denominational serial binary number from a second similar number, the digits of successive denominations of each said number being successively represented by one of two predetermined voltages representing a binary one and a binary zero respectively and the voltages representing the same denominations of the two numbers appearing simultaneously, the combination of storage means for storing between successive denominations inter-denominational carry digit representing voltages, electronic comparing means, means for applying successively to said comparing means the voltage representations of the successive digits of said first number and the carry digit representing voltages from said storage means, said comparing means selectively producing for each denomination a first and a second distinctive signal, said distinctive signals representing equality and inequality respectively of said applied voltages, means responsive to the production of said first distinctive signal for reading out as a difference digit representing voltage, said predetermined voltage other than that representing the digit of the same denomination of said second number and for applying to said storage means the voltage representation of said digit of said second number to cause said carry digit representing voltage to agree with the voltage representation of said digit of said second number, and means responsive to the production of said second distinctive signal for reading out as a difference digit representing voltage, the voltage representation of said digit of the same denomination of said second number.

12. In an electronic adding apparatus for summing a first and a second multi-denominational serial binary numbers, the digits of the successive denominations of each said number being successively represented by one of two predetermined voltages representing a binary one and a binary zero respectively and the voltages representing the digits in the same denomination of the two numbers appearing simultaneously, the combination of storage means having two stable states for storing successive inter-denominational carry digit representing voltages by its state, electronic comparing means, means for applying successively to said comparing means the voltage representations of the successive digits of said first number and the carry digit representing voltage controlled by the state of said storage means, said comparing means giving for each denomination a first distinctive signal in respect of an equality and a second distinctive signal in respect of inequality of said voltages applied to said comparing means, gating means controlled by said first distinctive signal for reading out as a sum digit representing voltage, the voltage representing the digit of the same denomination of said second number and gating means controlled by said second distinctive signal for reading out a sum digit representing voltage, said predetermined voltage other than that representing the digit of said same denomination of said second number, and means for resetting the state of said carry storage solely operated by gating means controlled by said second distinctive signal and voltage representing the digit of said second number so that the state of said carry storage device is set to agree with the signal representation of said digit of said second number and is left in unchanged state upon occurrence of said first distinctive signal.

References Cited in the file of this patent

UNITED STATES PATENTS

| | | |
|---|---|---|
| 2,580,771 | Harper | Jan. 1, 1952 |
| 2,600,744 | Eckert et al. | June 17, 1952 |
| 2,643,820 | Williams et al. | June 30, 1953 |
| 2,646,501 | Eckert et al. | July 21, 1953 |
| 2,655,598 | Eckert et al. | Oct. 13, 1953 |
| 2,719,670 | Jacobs et al. | Oct. 4, 1955 |

OTHER REFERENCES

Williams et al.: Universal High-Speed Digital Computers; Serial Computing Circuits, published in Proceedings of the Institute of Electrical Engineers, part II, April 1952. (Date made available to the public July 16, 1951.) (Pages 107 to 119, pages of interest 111 and 112.)